United States Patent [19]

Beaver et al.

[11] Patent Number: 5,149,105
[45] Date of Patent: Sep. 22, 1992

[54] METHOD AND APPARATUS FOR REPAIRING VESSELS

[75] Inventors: Phillip R. Beaver; Thomas E. Henke; Charles R. Bergen; Cecil P. Loechelt, II, all of Baton Rouge, La.

[73] Assignee: Ethyl Corporation, Richmond, Va.

[21] Appl. No.: 652,982

[22] Filed: Feb. 11, 1991

[51] Int. Cl.[5] .......................... F16J 15/06; G01M 3/04
[52] U.S. Cl. ........................................... 277/1; 277/2; 73/40.7; 220/465
[58] Field of Search .......................... 277/1, 2, 3, 70; 73/40.7, 49.2 T; 220/465, 601, 235, 236

[56] References Cited

U.S. PATENT DOCUMENTS

| | | | |
|---|---|---|---|
| 3,349,951 | 10/1967 | Peterson | 220/465 |
| 4,283,937 | 8/1981 | Aoki et al. | 73/40.7 |
| 4,335,883 | 7/1982 | LeRoux et al. | 277/2 |
| 4,344,320 | 8/1982 | Haupt et al. | 73/40.7 |
| 4,440,309 | 4/1984 | Morimoto | 220/235 |
| 4,505,186 | 3/1985 | Meier et al. | 277/2 |
| 4,674,321 | 7/1987 | Joshi | 73/40.7 |
| 4,699,294 | 10/1987 | Carlin, Jr. | 220/465 |
| 4,715,213 | 12/1987 | McGreehan et al. | 277/2 |
| 5,056,680 | 10/1991 | Sharp | 220/465 |

Primary Examiner—William A. Cuchlinski, Jr.
Assistant Examiner—Daniel G. DePumpo
Attorney, Agent, or Firm—David E. LaRose

[57] ABSTRACT

This invention relates to a method and an apparatus for sealing a port of a vessel, which apparatus comprises: (a) a seal for forming a gas-tight seal with the port to close off the port, (b) a chamber; and (c) a chamber sweeping gas for sweeping the chamber.

19 Claims, 1 Drawing Sheet

METHOD AND APPARATUS FOR REPAIRING VESSELS

BACKGROUND

This invention relates to an apparatus and a method for repairing and/or monitoring the integrity of a repair to a vessel port.

Vessels used in corrosive and hazardous chemical services are often manufactured from exotic metals such as titanium, tantalum, nickel, nickel/copper alloys, nickel/chromium alloys, nickel/molybdenum alloys, etc. These materials, while providing a measure of protection against leakage of the corrosive, hazardous, and/or lethal materials, are not without drawbacks. Vessels manufactured out of exotic materials are frequently more expensive and usually require sophisticated fabrication techniques.

In order to obtain the advantages of increased corrosion resistance and safety which may be found in vessels manufactured out of exotic materials without the disadvantages noted above, lined vessels are used in corrosive and hazardous chemical service. The vessel liners may be in the form of corrosion resistant coatings or paints, exotic metals, rubber (natural or synthetic), graphite, glass, ceramic, fluorocarbon compounds such as Teflon ® or Kynar ® resins, fiberglass reinforced plastics (FRP), and the like. Generally, lined vessels are fabricated from an inexpensive metal or plastic substrate which provides mechanical and structural support for the liner. The substrate is usually not resistant to corrosion but is protected, nonetheless, from corrosion by the vessel liner.

During its life, the lined vessel is frequently subjected to conditions which decrease the useful life of the vessel due to damage to or failure of the vessel liner. Conditions which may decrease the life of the lined vessel include uncontrolled, rapid heating or cooling of the vessels or vessel contents, exposure of the vessel liner to materials for which the vessel is not designed, poor maintenance practices, exposure of the vessel substrate to corrosive materials, and the like. Furthermore, pinholes and cracks may develop in glass, rubber, metal, and plastic liners due to abuse of the liners during vessel maintenance, corrosion, and/or erosion.

A particularly likely area of lined vessel failure occurs in the vessel ports or flanged connections, particularly on the flange face of the port whereon the vessel liner terminates. Damage to the liner on the face of the flange may be due to improper flange alignment, gasket leakage, improper tightening of the flanges, striking the flange face with a foreign object, the presence of a foreign material between the mating flange surfaces, and the like. In order to utilize a vessel having a damaged liner in the port area of a vessel, it is desirable to plug the port in order to inhibit corrosion of the vessel substrate. Once the damaged vessel port is plugged, the vessel can be used until such time as a permanent repair to the liner can be effected.

Until now, methods and apparatus for plugging or sealing off a damaged vessel port have not provided adequate means for detecting the presence of or preventing leakage of corrosive material past the plug to the area of the vessel port which is no longer sufficiently protected by the vessel liner. One means which is used for repairing a damaged glass liner is to cover and seal the damaged area with a Teflon ® plug and tantalum liner with a Teflon ® seal, then to back fill the sealed area with a filler material such as Pfauder ® S-Filler/Boot Filler or Siloxirane ® C2131 putty. The disadvantage of this method and apparatus is that leakage past the repair can occur due to imperfections in the plug, sealing material and vessel liner as well as permeation of a corrosive material through the plug and seal. It is well known that Teflon ® resin is permeable to halogens such as chlorine and bromine. Furthermore, when the operating pressure inside the lined vessel exceeds the pressure downstream of the plug, leakage or permeation through the sealing material is more likely to occur. There is a need therefore for an apparatus and method for repairing a vessel port which not only protects the vessel substrate exposed due to liner failure, but also allows monitoring of the integrity of the repair.

SUMMARY OF THE INVENTION

This invention relates to a method and an apparatus for sealing a port of a vessel, which apparatus comprises: (a) a sealing means for forming a gas-tight seal with the port to close off the port, (b) a chamber forming means for forming, along with the sealing means, a chamber; and (c) a chamber sweeping means for sweeping the chamber.

DESCRIPTION OF THE PREFERRED EMBODIMENTS

Figure 1:
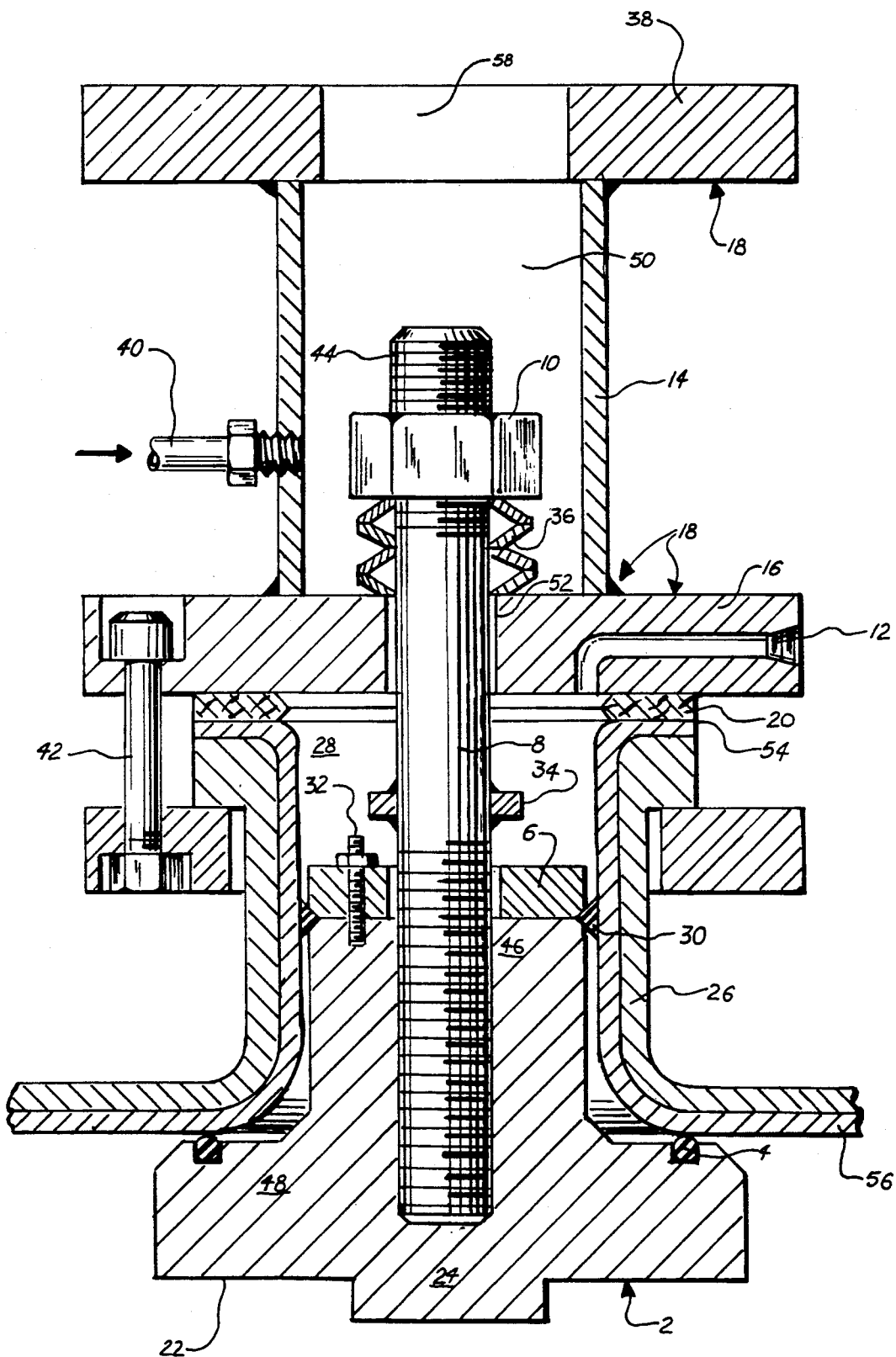
FIG. 1 is a cross-sectional view, not to scale, of an apparatus of this invention in its operative position for sealing a vessel port.

In one embodiment, this invention provides an apparatus for sealing a vessel port, which apparatus comprises: (a) a sealing means for forming a gas-tight seal with the port to close off the port; (b) a chamber forming means for forming, along with the sealing means, a chamber; (c) an inlet and an outlet which are both in gaseous communication with the chamber; (d) means for continually feeding an inert gas via the inlet, and continually exhausting the fed gas via the outlet; and (e) a monitoring means in gaseous communication with the outlet for determining the presence in the exhausted gas of a vessel fluid, atmospheric gases, or both a vessel fluid and atmospheric gases which may have leaked into the chamber.

A key feature of this invention is that all parts downstream of the sealing means may be made of less expensive or exotic materials than previously needed due to the use of the gas-tight sealing means to substantially prevent fluid communication between the vessel contents and the chamber and by use of an inert gas to sweep the chamber. Optionally, the parts downstream of the first sealing means may be coated with a paint or protective coating, such as Siloxirane ® C2131 (a product of Advanced Polymer Sciences, Inc.).

The apparatus of this invention is useful for repairing and/or sealing the port of any vessel, particularly a lined vessel which may contain a corrosive, hazardous and/or lethal material. By vessel port is meant any opening of the vessel which allows for ingress or egress of a fluid material into or out of the vessel, the port having a throat in fluid communication with the vessel. It is to be understood that the throat of the port may be minimal, that is, the longitudinal distance from the proximal end of the port adjacent the vessel to the distal end of the port may be in the range of from about 1 to about 2 inches or less. This longitudinal distance is not critical to the invention as long as there is sufficient length to form the chamber between the gas-tight sealing means and the chamber forming means.

By lined vessel is meant a vessel having a supporting substrate and a liner which is supported by the substrate.

The substrate may be formed from any material which is sufficient to provide mechanical and structural support for the liner at the pressures and temperatures for which the vessel is designed. The substrate need not, however, be resistant to corrosion and/or erosion when in contact with a vessel fluid. Generally, the substrate will be formed from a material which is less corrosion resistant than the liner yet strong enough to support the liner and provide the mechanical properties required by the vessel design. Hence, the substrate may be formed from carbon steel, stainless steel, fiberglass reinforced plastic (FRP) and the like.

The liner may be in the form of corrosion resistant paints or coatings or may be formed from corrosion resistant metals such as titanium, nickel, nickel/chromium alloys, nickel/molybdenum alloys, nickel/copper alloys, tantalum, and the like, or non-metallic materials such as rubber (natural or synthetic), graphite, glass, ceramic, fluorocarbon compounds such as Teflon ® or Kynar ® resins, FRP, and the like. The thickness of the liner is not critical to the invention. Hence, the liner thickness may be in the range of from about 4 mils or less to about 4 inches or more.

It is highly desirable that the liner be made from a substance which is essentially non-reactive with the vessel fluid with which the liner may come in contact. Preferably, the liner is made from glass, ceramic, titanium, or Teflon ® resin and most preferably glass or ceramic.

The lined vessel may be a tank, reactor, pump, compressor, heat exchanger, distillation column, evaporator, decanter, and the like having at least one port in fluid communication with the vessel, for ingress and egress of the vessel fluid. Preferably, the lined vessel is a tank, reactor, heat exchanger, or distillation column, and most preferably a tank, or reactor.

By vessel fluid is meant any liquid or gaseous material which may be in the vessel. This invention has particular application when repairing vessels containing corrosive or hazardous fluids. Such corrosive, hazardous and/or lethal fluids include, without limitation, chlorine, bromine, iodine, fluorine, HCl, HBr, HI, HF, $H_2SO_4$, acetic acid, oleum, hydrocyanic acid, NaCl, NaBr, NaI, KCl, KBr, KI, aluminum chloride, aluminum fluoride, aluminum sulfate, NaOH, MgOH, KOH, CO, $H_2S$, benzene, vinyl chloride, chlorobenzene, BrCl, methyl bromide, phosgene, a combination of two or more of the foregoing, or solutions thereof.

By use of the apparatus of this invention for repairing and/or sealing the port of a lined vessel, corrosion of the vessel substrate exposed due to liner failure can be effectively inhibited.

In a preferred embodiment, the apparatus of this invention comprises a gas-tight sealing means comprising a seal carrier having a primary seal for contact with the interior of the vessel adjacent to the proximal end of the port and a backup seal in contact with the vessel liner displaced from the primary seal and within the throat of the port. The seal carrier may be made from any material which is non-reactive with the vessel fluid and/or atmospheric gases with which it may come in contact.

Preferably the seal carrier is made from a metal selected from titanium, tantalum, nickel, nickel/chromium alloys, nickel/copper alloys; a rubber, either natural or synthetic; a fluorocarbon polymer such as Teflon ® or Kynar ® resin; a nylon resin; a polyester resin; wood; or a combination of two or more of the foregoing. More preferably, the seal carrier is made from titanium, tantalum, or Teflon ® resin and most preferably from Teflon ® resin which has been machined to accept the primary and backup seals.

The primary and backup seals are preferably formed from resilient materials in the shape of gaskets, o-rings, or the like which can be deformed to effectively provide the desired sealing characteristics. Suitable gasket or o-ring materials include, without limitation, soft metal alloys, Viton ® resin, Hypalon ® resin, Teflon ® resin, Kalrez ® resin, rubber (natural or synthetic), Garlock ® resin, graphitized resins, and the like. The sealing means and/or seals may also be provided by a filler type material which effectively fills at least a substantial portion of the annular space between the seal carrier and the throat of the vessel port. Such filler type materials which may be selected from, mastic sealant, silicone sealant, Pfauder ® S-Filler/Boot Filler, Siloxirane ® C2131 putty, or any combination of two or more of the foregoing.

In an operative position, the seal carrier is sealingly positioned in the vessel port so as to effectively prevent the ingress and egress of fluids into or out of the vessel. To hold the seal carrier in place, and to provide a force sufficient to deform the primary seal in order to effectively close off the vessel port, there is provided an adjustment rod, an urging means, and an adjustment means. The adjustment rod is fixedly attached to the seal carrier so that the rod projects from the seal carrier adjacent to the area of the seal carrier holding the backup seal and extends through the distal end of the vessel port. The adjustment rod may be formed from any material which is compatible with the vessel fluid such as titanium, tantalum, nickel, or nickel alloys or the rod may be formed from a material which, although non-compatible with the vessel fluid, is coated with a paint or coating sufficient to protect the rod from corrosion. The material from which the rod is formed is not critical to the invention.

The urging means may be provided by use of a spring, Bellville ® washers and the like. The adjustment means may be provided by a nut threadingly positioned on the rod.

To form the chamber, a chamber forming means is provided which is displaced from the gas-tight sealing means so as to form the chamber within the vessel port. The location of the chamber is not critical to the invention as long as at least a portion of the chamber is located upstream of the area of the vessel port containing the damaged liner. When at least a portion of the chamber is located upstream of the damaged area, the vessel substrate which would normally be exposed to the vessel contents in the absence of the apparatus of this invention, may effectively be isolated from contact with the vessel contents.

Preferably, the chamber forming means is located near the distal end of the vessel port and most preferably, the chamber forming means is a flanged spool having a cylindrical portion with a sealing flange fixedly attached at one end of the cylindrical portion, and an adjustment flange fixedly attached at the opposing end of the cylindrical portion so as to form an annular spool space between the flanges for accepting the adjustment rod. To provide a chamber which can be swept effectively by an inert gas, a gasket or other suitable sealing means is generally used between the sealing flange and the flange surface of the vessel port.

In a particularly preferred embodiment, the sealing flange has an opening for passing the adjusting rod therethrough whereby the adjusting rod is positioned essentially perpendicular to the plane of the sealing flange and within the annular spool space of the flanged spool. The opening in the sealing flange is preferably of a size sufficient to provide an annular space between the rod and the sealing flange opening so as to allow for fluid flow. Optionally, a sealing means may be used to form a gas-tight seal between the adjusting rod and opening in the sealing flange.

In a key feature of the invention, a chamber sweeping means is provided. The chamber sweeping means is comprised of an inlet and an outlet which are both in gaseous communication with the chamber and a means for continually feeding an inert gas via the inlet and exhausting the fed gas via the outlet. The inert gas fed into the chamber is used to carry a vessel fluid, atmospheric gases, or both a vessel fluid and atmospheric gases out of the chamber in the exhaust gas. The inert gas may be any gas which is non-reactive with the vessel substrate such as argon, nitrogen, helium, air, and the like.

If it is desirable to maintain a substantially constant differential between the chamber pressure and the vessel pressure, and/or the chamber pressure and the ambient atmosphere, than a second gas-tight sealing means may be used between the sealing flange and flange surface of the vessel port. The chamber pressure, however, is not critical to the invention. Accordingly, the pressure in the chamber may be atmospheric, subatmospheric or superatmospheric. It is highly desirable to utilize a chamber pressure which is less than the pressure in the vessel so as to provide a force sufficient to obtain a gas-tight seal whereby the ingress of vessel fluid into the chamber and/or egress of inert gas from the chamber into the vessel is effectively inhibited. The difference in pressure between the chamber and the vessel need not be great and indeed may be as little as 1psia or less. When the chamber pressure is less than the vessel pressure, leakage of vessel fluid or atmospheric gas or both into the chamber can be readily determined by monitoring changes in the chamber pressure or by monitoring the chamber outlet.

It may also be desirable to utilize a chamber pressure which is greater than the vessel pressure so that any leakage past the gas-tight sealing means will be into the vessel rather than into the chamber. In this case, the pressure in the chamber need only be sufficient provide a differential between the chamber pressure and the vessel pressure, e.g. 1 psia or less.

When a chamber pressure greater than the vessel pressure is utilized, the apparatus need not contain the outlet. The chamber can be pressurized with an inert gas via the inlet which inlet can also be used to monitor changes in the chamber pressure or inert gas flow thereby indicating the condition of the gas-tight sealing means and gaskets.

It is another feature of this invention, that the apparatus contain a monitoring means for determining the presence of a vessel fluid, atmospheric gases, or both a vessel fluid and atmospheric gases in the chamber. Monitoring of the chamber can be readily accomplished by use of a monitoring means such as a gas chromatograph; a metal oxide absorption resistance sensor; a pH or ORP (oxidation/reduction potential) probe; a pressure gauge a temperature gauge; a flow meter; a thermal conductivity detector, or two or more of the foregoing, which monitoring means is compatible with the fluid to be determined in chamber. It is not critical to the invention that the monitoring means be used continually t monitor the chamber. It is also not critical that the monitoring means be in continuous communication with the chamber, however, continuous communication is highly desirable so that there can be early detection of any failure of any one or more of the sealing means or seals so as to reduce the incidence of contact between the fluid and the vessel substrate.

A cross-sectional view of one embodiment of the invention is illustrated in FIG. 1. The vessel port which is plugged by the apparatus of this invention is defined by the vessel walls which are comprised of a substrate 26 and a liner 56.

The apparatus 2 of this invention comprises a seal carrier 22 containing a primary seal 4, a backup seal 30, a carrier adjustment rod 8, carrier urging means 36, a carrier adjustment means 10, and a flanged spool 18. Preferably, the seal carrier 22 has a distal portion 46 having a diameter slightly smaller than the inside diameter of the port for carrying the backup seal 30, a proximal portion 48 having a diameter substantially greater than the inside diameter of the port for carrying the primary seal 4, and a rectangular or hexagonal extension 24. Extension 24 is used to prevent rotation of seal carrier 22 during installation in the vessel port. The primary seal 4 seals the vessel port by contacting the vessel walls adjacent to the proximal area of the port. The backup seal 30 seals the vessel port by contacting the liner 56 in the port of the vessel. The primary seal 4, the secondary seal 30 or both the primary and secondary seal may be used to form a gas-tight seal.

An urging plate 6 is adjustably attached to the seal carrier 22 by attachment means 32 so as to urge the backup seal 30 in contact with the vessel liner 56. The adjusting rod 8 is fixedly attached to the seal carrier 22 and passes through urging plate 6 so as to extend past the distal end of the port.

To maintain the seal carrier 22 in proper position within the vessel port and to form the chamber, there is provided a chamber forming means comprising a flanged spool 18 having an adjustment flange 38, a sealing flange 16, and a cylindrical portion 14, which flanges and cylindrical portion define an annular spool space 50 for accepting adjustment rod 8. Accordingly, adjustment rod 8 passes through flange opening 52 into annular space 50 of spool 18. It is highly desirable that flange opening 52 be large enough to allow for flow of a fluid into chamber 28 from spool space 50 yet small enough to provide a sufficient surface for contact of urging means 36.

Rod adjustment means 10 may be accessed via an opening 58 in adjustment flange. Flange opening 58 is effectively sealed by using a blind flange (not shown) and gasket (not shown) removably attached to adjustment flange 38. By sealing flanged spool 18 with a blind flange and gasket, spool space 50 and chamber 28 may effectively be pressurized via inlet 40 of spool 18.

In order to form chamber 28, a gasket or sealing means 20 is provided between the flange surface 54 of the vessel port and the sealing flange 16 of spool 18.

Spool 18 is sealingly attached to vessel flange 54 by attachment means 42.

When adjustment end 44 of rod 8 is positioned in annular spool space 50, seal carrier 22 can be sealingly positioned by adjustment means 10 and urging means 36 to close off the vessel port. Urging means 36 is aligned with adjustment rod 8 such that there is a tendency, when urging means is compressed by adjustment means 10 to urge adjustment means 10 and sealing flange 16 in opposite directions. In a preferred embodiment, rod 8 further contains rod stopping means 34 fixedly positioned on rod 8 between sealing flange 16 and urging plate 6, the rod stopping means having a diameter effectively larger than flange opening 52 in sealing flange 16. Rod stopping means 34 provides protection against undesirable lateral movement of the adjustment rod.

In a highly preferred embodiment spool 18 contains inlet 40 in gaseous communication with annular space 50 and outlet 12 in gaseous communication with chamber 28 for feeding an inert gas via inlet 40, and continually exhausting the fed gas via outlet 12.

In another preferred embodiment, this invention provides a method for sealing a port of a vessel, which method comprises: (1) sealing the port with an apparatus comprising (a) a sealing means for forming a gas-tight seal with the port to close off the port, (b) a chamber forming means for forming, along with the sealing means, a chamber, (c) an inlet, and (d) an outlet which inlet and outlet are both in gaseous communication with the chamber; (2) feeding an inert gas via the inlet; (3) continually exhausting the fed gas via the outlet; and (4) monitoring the outlet to determine the presence in the exhausted gas of a vessel fluid, atmospheric gases, or both a vessel fluid and atmospheric gases which may have leaked into the chamber.

The method for sealing the vessel port to protect the substrate when the liner of a vessel port is damaged comprises closing off the vessel port upstream of the damaged area with apparatus 2, continuously feeding an inert gas via inlet 40, exhausting the fed gas via outlet 12, and monitoring the exhausted gas to determine the presence of a vessel fluid, atmospheric gases, or both a vessel fluid and atmospheric gases in the exhausted inert gas. If there is leakage of any vessel fluid or atmospheric gases into chamber 28 due to failure of any one or more of seals 4, 20, and/or 30, this failure can be detected by monitoring the chamber 28. By the beforementioned method, a damaged vessel port can be effectively closed off so as to allow vessel to be used for a prolonged period of time while providing a facile means for detecting failure of any one or more of the seals before significant damage to the vessel substrate can occur.

It is apparent that various modifications and changes can be made to the above apparatus and method without departing from the spirit and scope the invention.

What is claimed is:

1. A method for sealing a port of a lined vessel, which method comprises: (1) sealing said port with an apparatus comprising (a) a sealing means for forming a gas-tight seal with said port to close off said port, said sealing means containing an adjustment rod, an urging means, and an adjustment means, (b) a chamber forming means for forming, along with said sealing means, a chamber, (c) an inlet, and (d) an outlet which inlet and outlet are both in gaseous communication with said chamber; (2) feeding an inert gas via said inlet; (3) continually exhausting the fed gas via said outlet; and (4) monitoring said outlet to determined the presence in the exhausted gas of a vessel fluid, atmospheric gases, or both a vessel fluid and atmospheric gases which may have leaked into said chamber.

2. The method of claim 1 wherein the lined vessel is selected from a lined tank and a lined reactor.

3. The method of claim 2 wherein the vessel is lined with a substance selected from glass, rubber, Teflon ® resin, titanium, and tantalum.

4. The method of claim 1 wherein the inert gas is selected from nitrogen, and argon.

5. The method of claim 3 wherein the inert gas is selected from nitrogen, and argon.

6. The method of claim 1 wherein the vessel fluid is selected from a halogen and a halogen containing compound.

7. The method of claim 5 wherein the vessel fluid is selected from a halogen and a halogen containing compound.

8. An apparatus for sealing a port of a lined vessel, which apparatus comprises: (a) a sealing means for forming a gas-tight seal with said port to close off said port, said sealing means containing an adjustment rod, an urging means, and an adjustment means, (b) a chamber forming means for forming, along with said sealing means, a chamber; and (c) a chamber sweeping means for sweeping said chamber.

9. The apparatus of claim 8 wherein the vessel is lined with a substance selected from glass, rubber, titanium, tantalum, and Teflon ® resin.

10. The apparatus of claim 9 wherein said chamber sweeping means is comprised of an inlet and an outlet which are both in gaseous communication with said chamber, and means for continually feeding an inert gas via said inlet, and continually exhausting said fed gas via said outlet.

11. The apparatus of claim 10 further comprising a monitoring means in gaseous communication with said outlet for determining the presence in the exhausted gas of a vessel fluid, and/or atmospheric gases which may have leaked into said chamber.

12. The apparatus of claim 11 wherein the monitoring means is a gas chromatograph.

13. The apparatus of claim 10 wherein said inert gas is selected from nitrogen and argon.

14. The apparatus of claim 12 wherein the inert gas is selected from nitrogen and argon, and the monitoring means is a metal oxide absorption resistance sensor.

15. A method for sealing a port of a lined vessel, which method comprises: (1) sealing said port with an apparatus comprising (a) seal carrier comprising a first sealing means for forming a first gas-tight seal with said port to close off said port and a second sealing means for forming a second seal with said port at a location displaced from said first sealing means whereby a chamber is provided between said sealing means, said seal carrier further comprising an adjustment rod, an urging means, and an adjustment means, and (b) an inlet which is in gaseous communication with said chamber; (2) feeding an inert gas via said inlet so as to pressurize said chamber to a pressure at least above the vessel pressure; and (3) continually monitoring said chamber pressure or inert gas flow via said inlet.

16. The method of claim 15 wherein the vessel is lined with a substance selected from glass, rubber, Teflon ® resin, titanium and tantalum.

17. The method of claim 16 wherein the inert gas is selected from nitrogen, and argon.

18. The method of claim 17 wherein the vessel fluid is selected from a halogen and halogen containing compound.

19. The method of claim 18 wherein said second sealing means is a gas-tight sealing means.

* * * * *